United States Patent [19]

Colburn

[11] Patent Number: 4,587,083
[45] Date of Patent: May 6, 1986

[54] METHOD FOR REMOVING CESIUM FROM A NUCLEAR REACTOR COOLANT

[75] Inventor: Richard P. Colburn, Pasco, Wash.

[73] Assignee: The United States of America as represented by the United States Department of Energy, Washington, D.C.

[21] Appl. No.: 521,815

[22] Filed: Aug. 10, 1983

[51] Int. Cl.$^4$ .............................................. G21C 19/42
[52] U.S. Cl. .................................... 376/313; 210/791
[58] Field of Search .................... 376/310, 312, 313; 210/675, 676, 677, 773, 774, 806, 791, 195 R, 253, 337

[56] References Cited

U.S. PATENT DOCUMENTS

| | | | |
|---|---|---|---|
| 3,421,835 | 1/1969 | McCarty | 210/791 |
| 3,693,959 | 9/1972 | Swinhoe et al. | |
| 3,848,067 | 11/1974 | Cooper. | |
| 3,941,586 | 3/1976 | McKee, Jr. | |
| 3,962,082 | 6/1976 | Hundal | 210/773 |
| 4,004,971 | 1/1977 | Freck et al. | |
| 4,010,068 | 3/1977 | Cooper. | |
| 4,073,683 | 2/1978 | Van Der Schoot | 376/328 |
| 4,075,060 | 2/1978 | Colburn. | |

OTHER PUBLICATIONS

Takahashi et al., Regeneration of a Large Cold Trap, Nuclear Technology, vol. 54, Sep. 81.

*Primary Examiner*—Deborah L. Kyle
*Assistant Examiner*—Richard W. Wendtland
*Attorney, Agent, or Firm*—Edward W. Nypayer; Robert Southworth, III; Judson R. Hightower

[57] ABSTRACT

A method of and system for removing cesium from a liquid metal reactor coolant including a carbon packing trap in the primary coolant system for absorbing a major portion of the radioactive cesium from the coolant flowing therethrough at a reduced temperature. A regeneration subloop system having a secondary carbon packing trap is selectively connected to the primary system for isolating the main trap therefrom and connecting it to the regeneration system. Increasing the temperature of the sodium flowing through the primary trap diffuses a portion of the cesium inventory thereof further into the carbon matrix while simultaneously redispersing a portion into the regeneration system for absorption at a reduced temperature by the secondary trap.

6 Claims, 3 Drawing Figures

4,587,083

METHOD FOR REMOVING CESIUM FROM A NUCLEAR REACTOR COOLANT

The United States Government has rights in this invention pursuant to Contract No. EY-76-C-14-2170 between the U.S. Department of Energy and the Westinghouse Electric Corporation.

BACKGROUND OF THE INVENTION

The present invention relates generally to nuclear reactors and, more particularly, to the removal of cesium from the liquid metal coolant of a fast breeder nuclear reactor.

A typical fast breeder nuclear reactor employs liquid sodium as a coolant to remove the tremendous heat generated by the nuclear fission of fissile materials. The heat carried by the coolant is ultimately transformed into steam via a secondary system for the generation of electrical energy. The liquid sodium is circulated through a closed heat transport system known as the primary coolant system which includes the reactor vessel, a heat exchanger or a steam generator, a suitable piping system for serially connecting these components together, and a pump for circulating coolant therethrough. The liquid sodium can be substantially contaminated by the volatile, radioactive fission products resulting from breached or vented fuel elements during reactor operation. Cesium is known to be one of the dominant radioactive contaminants found in the primary coolant system and its deposition on the cooler surfaces of sodium coolant systems has often been observed. The presence of cesium in the primary coolant system poses a safety and health hazard, especially during reactor refueling, maintenance and/or primary coolant system repairs wherein contact maintenance is required with resultant personnel exposure to the hostile environment. Also, any leakage of the contaminated coolant from this primary system, although highly improbable, would pose further safety risks. Accordingly, it can be appreciated that cesium removal is of paramount importance in reducing the health hazards associated with fast breeder nuclear reactors.

Various attempts have been made to solve this cesium contamination problem including the use of a cold trap purification system. However, this arrangement has been only marginally effective in removing cesium and the extent or magnitude of cesium removal has varied widely. This variability in cesium deposition behavior is believed due to interactions with other contaminants in the sodium system with both oxides and hydrides being proposed as possible contaminants responsible for increased cesium deposition. However, other approaches involving deliberate additions of oxygen and hydrogen, respectively, suggested that oxide and hydrides do not enhance cesium deposition. One of the more successful solutions in removing cesium from a sodium coolant system involves the use of a special carbon packing trap provided in the circulating system of the liquid sodium flow. Such a trap was employed in the sodium coolant system of the Experimental Breeder Reactor II (EBR-II) facility in Idaho Falls, Id. It was found that under relatively low temperature conditions, graphite or amorphous carbon packing employed in the trap could remove about 90% of the cesium activity from the sodium in the primary coolant system.

The present invention constitutes an improvement over this cesium removal system and is directed to a method and system for regenerating the primary carbon packing trap of the primary system to realize further reductions in the cesuim activity therein than has heretofore been possible.

Accordingly, it is a primary object of the present invention to provide a new and useful method and system for more efficiently removing cesium from a reactor coolant.

It is another object of this invention to provide in the primary coolant system of a nuclear reactor a regeneration flow system selectively connected to the primary system's main trap for reducing the cesium inventory otherwise entrained therein.

It is a further object of the present invention to provide a new and useful regeneration method and system for regenerating the main cesium trap in a sodium coolant system and improving its cesium absorption capabilities.

These and other objects, advantages, and characterizing features of the present invention will become clearly apparent from the ensuing detailed description of an illustrative embodiment thereof, taken together with the accompanying drawings wherein like reference characters denote like parts throughout the various views.

SUMMARY OF THE INVENTION

The present invention is characterized by the provision of a regeneration subloop system selectively connected to a primary liquid metal coolant system having a primary carbon packing trap for absorbing cesuim from the coolant flowing therethrough at a relatively low temperature. When saturated with cesuim, the primary trap is isolated from the primary system and connected to the regeneration system which includes a secondary carbon packing trap. The coolant passing through the primary trap is heated to facilitate dispersion of a portion of the cesuim inventory therof into the substantially smaller coolant volume of the regeneration system. This highly contaminated coolant is reduced in temperature prior to flowing through the secondary trap to enhance cesuim absorption thereby.

DETAILED DESCRIPTION OF THE PREFERRED EMBODIMENT

Figure 1:
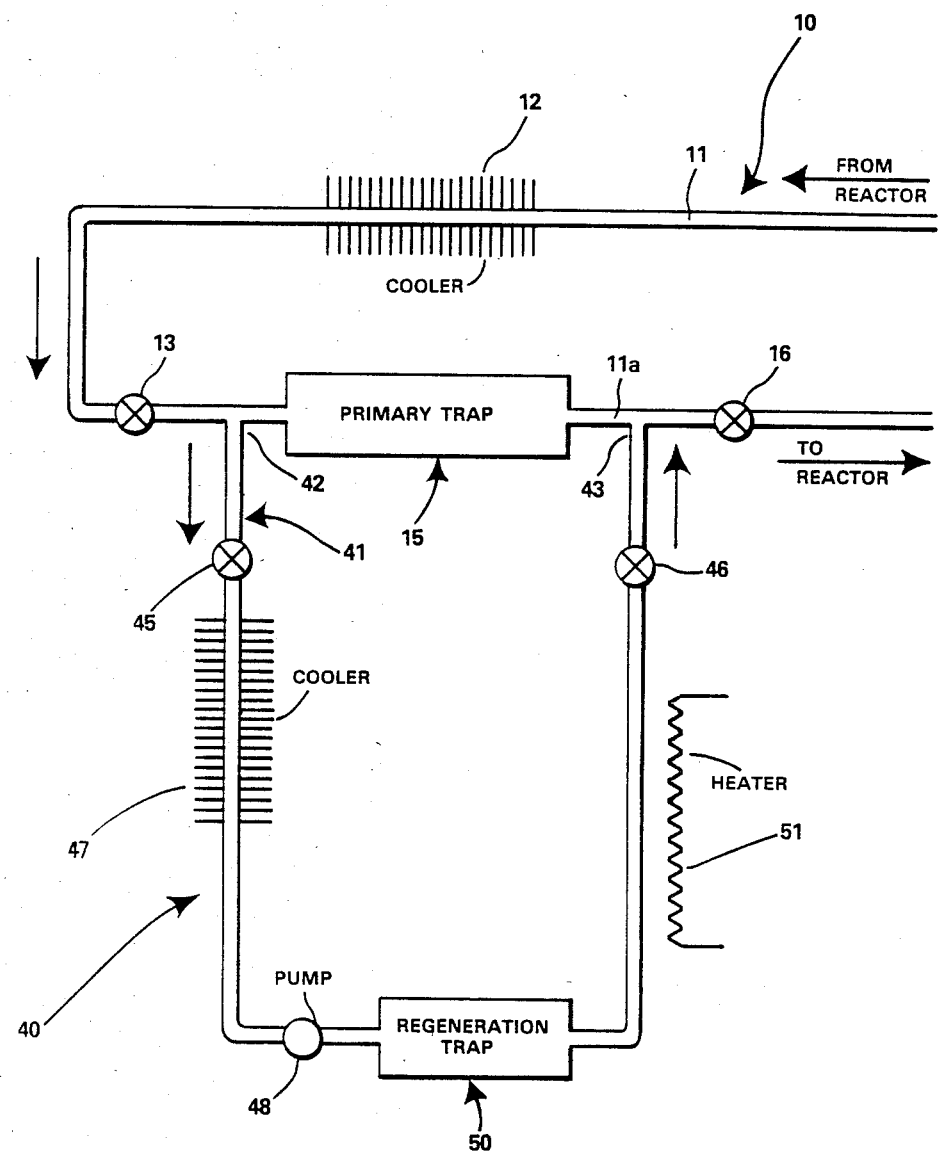
FIG. 1 is a schematic flow diagram of a portion of a nuclear reactor primary coolant system incoporating one form of a regeneration subloop system of this invention.

Referring now in detail to the illustrative embodiment depicted in the accompanying drawings, there is schematically shown in FIG. 1 a portion of a primary coolant system, comprehensively designated 10, which includes a filtering arrangement for removing cesium from the reactor coolant and which embodies certain novel features of this invention. This system 10 includes a main coolant flow conduit 11, forming a part of the primary coolant system or otherwise coupled in parallel thereto, preferably in the cold leg of the system downstream of the usual heat exchanger (not shown). As is well known, the primary reactor coolant, such as liquid sodium, is heated to extreme temperatures on passage through the core of a nuclear reactor pressure vessel to remove heat therefrom. This hot liquid sodium flows through the primary system to a heat exchanger for transferring heat from the primary system to another or secondary coolant system coupled in sealing arrangement with the primary system for ultimate conversion into steam in order to generate electrical energy.

Sometimes, an intermediate system is interposed between the primary and secondary systems of the nuclear reactor for safety reasons. This intermediate system also is closed and contains a liguid metal coolant, such as liquid sodium for example, while the secondary system enploys the necessary water for conversion into steam.

The sodium coolant flowing through conduit 11, previously reduced in temperature by passage through the heat exchanger, is further reduced in temperature by cooler 12 to approximately 200° C. This cooled sodium is conveyed through a normally open shut-off valve 13 and routed through a specially constructed filter or trap, generally designated 15, for removing cesium from the flowing liquid sodium. The treated or cleansed liquid sodium exiting trap 15 is routed via conduit 11a through a normally open shut-off valve 16 oack to the primary coolant system.

Figure 2:
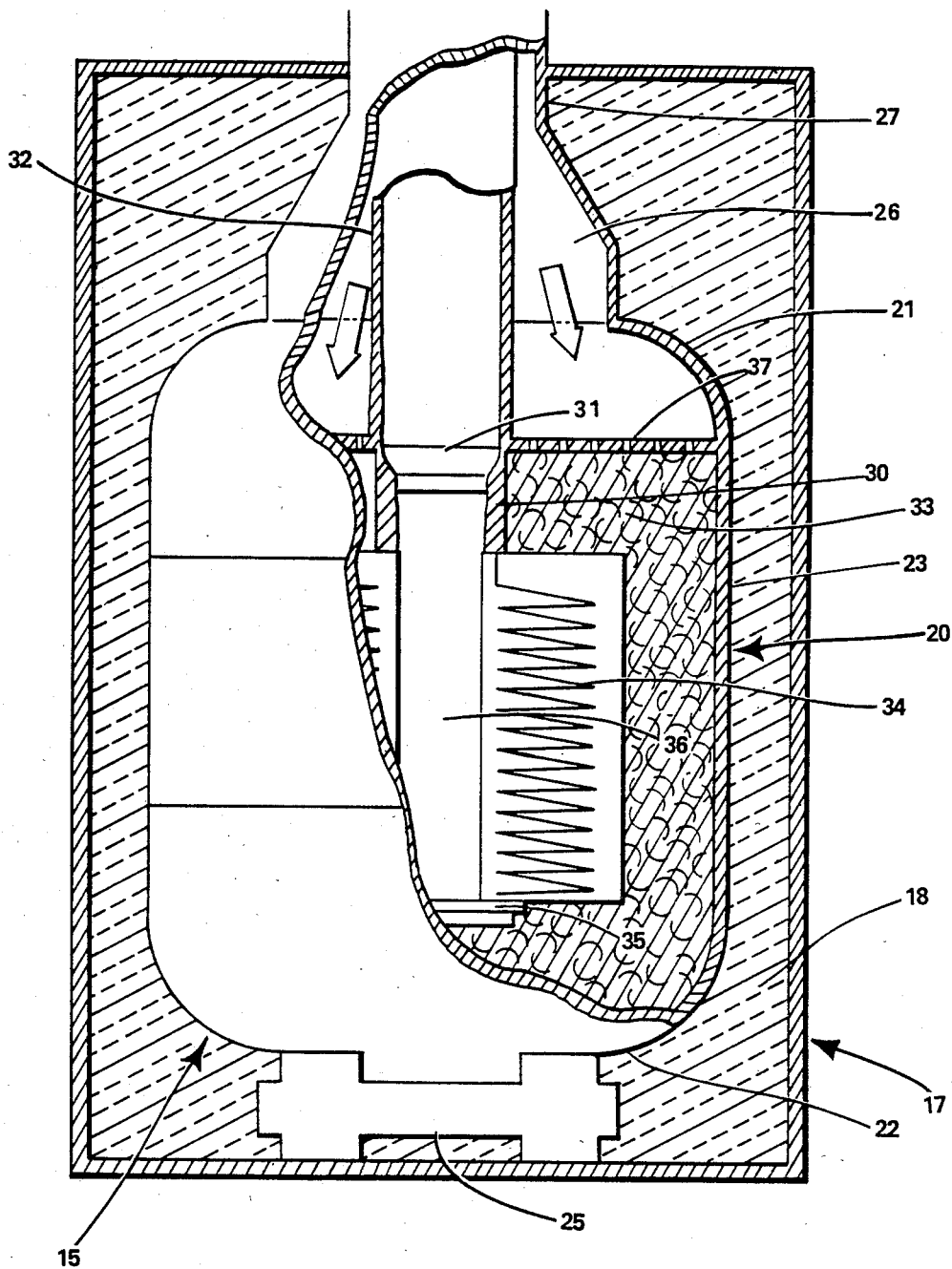
FIG. 2 is an elevational view, partly broken away and in section, of a trap utilized in the present invention.

An exemplary form of cesium trap 15 is illustrated in FIG. 2 and is enclosed in a containment 17 filled with a suitable thermal insulating material 18. The trap 15 comprises a generally cylindrical housing or shell 20 having a domed top wall 21, a bottom wall 22 and an annular side wall 23. The shell 20 is supported vertically on a suitable base or pedestal 25 within containment 17. The upper end of the shell 20 is in open communication with the outlet end 26 of a conduit 27 suitably connected to the conduit 11 at the entry end of trap 15 for receiving the contaminated liquid sodium coolant.

A vertically extending inner tube section 30 is mounted centrally within the shell 20 in radially spaced relation thereto. The upper end of inner tube section 30 is connected to the inlet end 31 of a conduit 32 suitably connected to the sodium conduit 11a at the exit end of trap 15 for returning the cleansed or treated sodium back to the primary coolant system.

The trap 15 is substantially filled with a packing 33 of low density amorphous carbon foam, preferably reticulated vitreous carbon, which serves to remove or absorb cesium from the liquid sodium passing therethrough. The reticulated vitreous carbon packing 33 provides a large surface area per unit volume and facilitates uniform flow distribution over the packing surface.

In order to prevent the escape of any packing particulates which tend to fragment during operation, a 35-micron sintered stainless steel screen 34 is provided for retaining the packing 33 within shell 20. The screen 34 is mounted centrally of shell 20 between the bottom end of tube section 30 and a mounting plate 35. The screen 34 is formed with an open central passage 36 communicating with the tube section 30. An annular perforated plate 37 is disposed on an upper surface of the packing 33 near the upper end of shell 20 and serves to maintain the packing 33 intact. Thus, the incoming liquid sodium is passed through the carbon packing 33 for removing the major portion of cesium activity therefrom. The cleansed or treated sodium flows through the screen 34 inwardly into passage 36, and via tube section 30, inlet 31 and conduit 32, is delivered into conduit 11a for reentry into tne primary coolant system.

It should be understood that the use of carbon to control cesium contamination has been previously proposed. It was found that cesium could be appreciably removed from liquid sodium by graphite or amorphous carbon packing at relatively low temperatures ranging from about 170° C. to about 230° C., and preferably about 200° C. The cesium is not merely physically adsorbed on the packing surface but is chemically bonded to the carbon. Such carbon packings form a number of compounds with cesium without in any way affecting the sodium. However, the reduced temperatures which were found to favor cesium activity absorption by the carbon packing are too low to permit adequate diffusion of the cesium into the carbon matrix at a useful rate. Accordingly, only the packing material in the immediate vicinity of the packing surface is utilized during these low temperature trap operations so that the packing saturates after removing approximately 90% of the radioactive cesium from the liquid sodium. While raising the trap temperature substantially above the hereinbefore mentioned range would be desirable in diffusing the cesium further into the carbon matrix, it has the disadvantage of shifting the equilibrium toward redispersing the cesium back into the liquid sodium. Thus, while the known carbon filtering arrangement so far described has admirably served its purpose in removing a major portion of radioactive cesium from a liquid sodium coolant, its cesium removal capability remains limited.

The present invention addresses this problem and increases the efficiency of the above described cesium removal system by providing an auxilliary or subloop system, generally designated 40 (FIG. 1), for regenerating the main or primary trap 15 as will hereinafter be described. This regeneration system 40 includes a conduit 41 having an inlet 42 tapped into the main conduit 11 between the valve 13 and the inlet of primary trap 15 and an outlet 43 tapped into conduit 11a between the outlet of primary trap 15 and valve 16. Flow through the conduit 41 is selectively controlled by an inlet shut-off valve 45 and an outlet shut-off valve 46. The conduit 41 directs sodium flow through a cooler 47, a pump 48 for circulating the liquid sodium in the isolated subloop system 40, a secondary or regeneration trap 50, and a heater 51 downstream of the trap 50, all serially connected by the conduit 41.

The regeneration trap 50 can be identical in construction and operative in the same manner as primary trap 15, except that the former is substantially smaller than trap 15, containing a packing volume of from about 10% to 50% of the primary trap packing volume for example. It should be appreciated that the regeneration trap 50 of this invention is not limited to the specific trap described and shown in FIG. 2, but can vary widely in construction and configuration within the purview of the present invention, so long as it embodies a suitable carbon packing material through which the contaminated coolant flows. Also, the total volume of sodium circulated in the regeneration system 40, which would include the primary trap 15 in operation, is approximately $10^{-3}$ to $10^4$ of the volume of the primary coolant system.

In operation under normal conditions, the temperature of the sodium flowing through main conduit 11, as reflected in the cold leg of the primary coolant system, is a reduced to approximately 200° C. by cooler 12 prior to passing through the primary trap 15, wherein the major portions of the radio active cesium is removed from the sodium. At this time, inlet and outlet valves 45 and 46 are closed to disconnect the regeneration system 40 from the primary system. As earlier noted, the filtering or cesium absorption operation continues until the carbon packing 33 in primary trap 15 reaches saturation upon removing approximately 90% of the cesium activity from the primary sodium coolant system.

In accordance with this invention, after the primary trap 15 loses its cesium removal efficiency, it is isolated from the primary system by closing normally open valves 13 and 16 and is connected to the regeneration system 40 by opening normally closed valves 45 and 46. Circulation is established in the regeneration subloop system 40 by pump 48 and a differential temperature is created across the regeneration system 40 by activating cooler 47 and energizing the heater 51. Preferably, cooler 47 is effective to maintain the sodium passing through regeneration trap 50 at about 200° C. heater 51 increases the temperature of the sodium passing through the primary trap 15 to about 500° C. At this elevated temperature, the cesium inventory in the primary trap 15 tends to disperse into the limited sodium volume of subloop system 40 while some of the cesium within packing 33 of trap 15 will diffuse further into the packing matrix thereof. In the meantime, the carbon packing within the regeneration trap 50 at the reduced temperature of about 200° C. now begins to absorb cesium from the relatively high concentration of cesium contamination in the drastically reduced sodium volume of the isolated subloop system 40. Thus, primary trap 15 releases cesium while regeneration trap 50 absorbs or accumulates cesium at these respective controlled temperatures. This activity continues until equilibrium is reached at which time the primary trap 15 is then isolated from the regeneration subloop system 40 by closing valves 45 and 46 and reconnected to the primary system by opening valves 13 and 16. The primary trap is then cooled to its normal operating temperature of about 200° C. and, because of the reconstituted carbon packing surface, i.e. the reduced cesium concentration therein, is now conditioned to effect a still further reduction of the radioactive cesium concentration in the primary coolant system. Thus, by regenerating the primary trap 15, appreciably more than 90% of the cesium contamination in the primary sodium coolant system can be removed. Indeed, even further trapping efficiency can be realized by periodically isolating the regeneration trap 50 and connecting the same to still another regeneration subloop system for reducing its cesium inventory and diffusing a portion thereof deeper into its carbon packing. In the same manner described above, the secondary trap 50 can be reconditioned to, in turn, further absorb more of the cesium content of primary trap 15.

Figure 3:
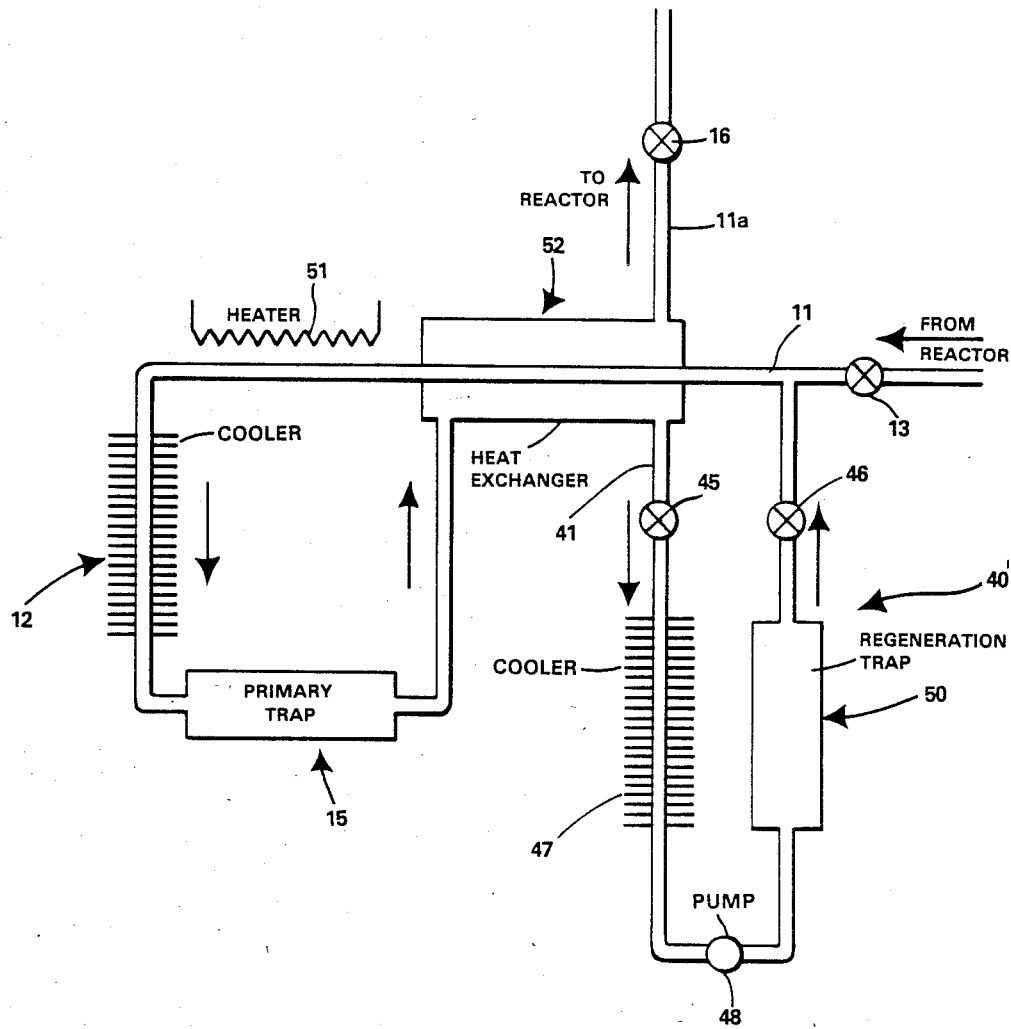
FIG. 3 is another form of a regeneration subloop system embodying the principles of this invention.

FIG. 3 illustrates another form of a regeneration subloop system 40' which differs primarily from the regeneration system 40 first described by utilizing a heat exchanger 52 to minimize the direct heating and cooling requirements otherwise needed during regeneration. Also, the heater 51 is provided in the main conduit 11 rather than in the conduit 41 of regeneration subloop system 40'. The same reference characters are employed to identify components similar to the form of the invention earlier described.

Under the usual operating conditions, valves 13 and 16 are open while inlet and outlet valves 45 and 46 are closed to disconnect the regeneration system 40'. Also, heater 51 is deenergized. Thus, the temperature of the sodium coolant flowing through conduit 11 is reduced in heat exchanger 52 and further reduced, if required, to approximately 200+ by cooler 12 prior to entry into the primary trap 15. The treated and cooled sodium then flows through the shell side of exchanger 52 in heat exchange relation to the hot sodium flowing through conduit 11. The sodium exiting the shell side of exchanger 52 is then returned via conduit 11a to the primary coolant system.

When the primary trap 15 becomes saturated as earlier described, it is isolated from the primary coolant system by closing valves 13 and 16 and connected to the regeneration subloop system 40' by opening valves 45 and 46. Flow is established in this subloop system 40' by pump 48 and a differential temperature is created across the subloop 40' by deactivating cooler 12 and activating heater 51 and cooler 47. Thus, a closed system is provided in which the sodium flowing through conduit 11 passes through the heat exchanger 52, is heated to approximately 500° C. by heater 51 and then flows primary trap 15. The sodium exiting trap 15 passes through the shell side of heat exchanger 52 wherein it is somewhat reduced in temperature, is further reduced in temperature to about 200° C. by cooler 47, and then passes through regeneration trap 50. As in the first instance, some of the cesium inventory in primary trap 15 will diffuse further into the carbon packing matrix thereof while some will be redispersed back into the limited sodium volume of regeneration subloop system 40' and absorbed by regeneration trap 50 until equilibrium is achieved. The primary trap 15 is then disconnected from subloop system 40' by closing valves 45 and 46 and reconnected to the primary coolant system by opening valves 13 and 16. Cooler 47 and heater 51 are then deactivated while cooler 12 is activated to again cool the hot sodium from the primary system to approximately 200° C. for treatment through the reconditioned primary trap 15, the latter now being effective to realize a greater than 90% reduction of the cesium content in the primary sodium coolant system.

From the foregoing, it is apparent that the objects of the present invention have been fully accomplished. As a result of this invention, a new and improved system is provided for enhancing the removal of cesium from a liquid sodium coolant with greater efficiencies than have heretofore been realized. By the provision of a regeneration subloop system having a secondary cesium trap and which is selectively connected to a primary sodium coolant system, the primary cesium trap can be reconditioned to materially extend its useful life while enhancing cesium removal from the primary sodium coolant system.

It is to be understood that the forms of the invention herein shown and described are to be taken as illustrative embodiments only of the same, and that various changes in the details and arrangement of components and parts, as well as various procedural changes, may be resorted to without departing from the spirit of the invention.

I claim:

1. A method for removing cesium from a liquid metal circulating through a primary cooling system of a nuclear reactor comprising: providing a primary carbon packing trap in said primary system, continually absorbing cesium from said coolant onto said carbon packing trap at a relatively low temperature until said trap is substantially saturated with cesium, isolating said primary trap when saturated from said primary system by disconnecting said trap therefrom and connecting said primary trap to a closed regeneration flow system having a secondary carbon packing trap, said closed regeneration flow system being completely isolated from said primary coolant system and having a volume substantially smaller than said primary coolant system, increasing the temperature of the coolant passing through said primary trap, diffusing a portion of the cesium inventory on the surface of said primary trap further into the matrix thereof while dispersing a portion of said cesium inventory into said coolant circulating through said regeneration flow system, reducing the temperature of said coolant passing through said secondary trap, and physically and chemically absorbing cesium from the coolant in said regeneration flow system onto said secondary carbon packing trap until cesium equilibrium between said traps is reached whereby the primary trap is reconditioned for further usage when reconnected to the primary system.

2. A method according to claim 1 wherein said coolant passing through said primary trap when connected to said primary system is cooled to a temperature ranging from about 170° to 230° C.

3. A method according to claim 1 wherein said coolant passing through said primary trap when connected to said regeneration flow system is heated to a temperature of about 500° C. while said coolant passing through said secondary trap is cooled to a temperature ranging from 170° to 230° C.

4. In a primary coolant system of a nuclear reactor having a liquid metal reactor coolant, a cesium removal system comprising: a primary carbon packing trap in said primary system for absorbing cesium from the coolant passing therethrough at a relatively low temperature, a closed regeneration flow system of substantially smaller volume than said primary system having a secondary carbon packing trap and normally disconnected from said primary system, means isolating said primary trap from said primary system when said primary trap is substantially saturated with cesium, means connecting said primary trap to said closed regeneration flow system, means for heating said coolant passing through said primary trap to diffuse a portion of the cesium inventory on the surface of said primary trap further into the matrix thereof while dispersing a portion of the cesium inventory thereof into said regeneration flow system, means for cooling said coolant passing through said secondary trap for absorbing cesium from the coolant in said regeneration flow system until cesium equilibrium is reached between said primary and secondary traps whereby the primary trap is reconditioned for further usage when reconnected to said primary system.

5. A system according to claim 4, wherein the volume of carbon packing in said secondary trap ranges from about 10 to 50% of the volume of carbon packing in said primary trap.

6. A system according to claim 4, including a heat exchanger selectively coupled to said primary system and said regeneration flow system for assisting the heating means and cooling means in increasing and decreasing, respectively, the temperature of said coolant passing through said primary and secondary traps.

* * * * *